United States Patent Office 2,732,329
Patented Jan. 24, 1956

2,732,329

GASOLINE REFORMING PROCESS EMPLOYING A NICKEL SULPHATE ON ALUMINA CATALYST

Thomas F. Doumani, Los Angeles, Calif., assignor to Union Oil Company of California, Los Angeles, Calif., a corporation of California No Drawing. Application July 6, 1951, Serial No. 235,578

9 Claims. (Cl. 196—50)

This invention relates generally to catalysts and catalytic processes for the conversion of hydrocarbons and hydrocarbon mixtures. More particularly this invention relates to new and improved methods for the preparation of alumina-supported metal sulfate catalysts and especially to the preparation of alumina-supported nickel sulfate catalyst and to the use of such catalysts for reforming hydrocarbons and hydrocarbon mixtures in the presence of hydrogen.

A catalyst suitable for reforming of hydrocarbon stocks at high temperatures should preferentially exhibit only slight activity for destructive hydrogenation resulting in scission of carbon-carbon bonds while at the same time exhibiting pronounced activity for the reformation of molecules into other molecules containing substantially the same number of carbon atoms per molecule. The latter reactions are characteried by hydrogenation, dehydrogenation, isomerization, desulfurization, denitrogenation and the like.

Nickel catalysts have been employed in the prior art for the hydrogenation and dehydrogenation of various organic substances such as hydrocarbons. Such catalysts have been of little practical value in the reforming of hydrocarbon stocks owing to the pronounced tendency of the nickel catalyst to promote carbon-carbon scission. The reforming activity of such nickel catalysts may be suppressed by sulfiding resulting in the formation of various nickel sulfides but such sulfided catalysts generally exhibit low activities for the desired hydrogenation and dehydrogenation reactions.

It has now been found that certain nickel sulfate catalysts supported on alumina show excellent reforming characteristics while at the same time causing only minor amounts of destructive hydrogenation of the feed stock to produce low boiling hydrocarbons and hydrocarbon gases. The presence of the sulfate appears to inhibit the hydrocracking reactions while not impairing the dehydrogenation character of the nickel component. The catalyst gives high liquid recoveries, increased yields of hydrogen, and decreased yields of methane and other lighter hydrocarbons resulting from hydrocracking of the feed stock. The activity of the nickel sulfate-alumina catalyst can be further increased by impregnating inorganic halogen-containing acids on the carrier or the catalyst.

It is an object of this invention to provide catalysts for reforming which produce little or no splitting of the feed stock molecules.

It is another object of this invention to provide a nickel catalyst for use in hydrocarbon conversion reactions which gives high yields of hydrogen and produces small coke laydown on the catalyst.

It is another object of this invention to provide a process for catalytically upgrading gasoline with a nickel sulfate catalyst supported on an alumina carrier.

It is another object of this invention to promote nickel sulfate catalysts with inorganic halogen-containing acids.

Other objects and advantages of this invention will become apparent to those skilled in the art as the description thereof proceeds.

Briefly this invention relates to the preparation and use of certain alumina-supported nickel sulfate catalysts and particularly to the use of such catalysts in catalytic reforming in the presence of hydrogen.

The carriers which have been found suitable for distending nickel sulfate with or without other added metal oxides or sulfides comprise alumina and other carriers containing a major proportion of alumina. The carrier usually contains at least about 80% by weight of alumina. Such carriers in addition to the alumina may contain minor proportions such as between about 0.5% and 20% by weight of other oxides such as silica, titania, ferric oxide, stannic oxide, magnesia, magnesium hydroxide, thoria, zirconia and the like. The preferred carrier is activated, gel-type alumina. Gel-type aluminas are generally characterized by their high surface areas. Gel aluminas usually have surface areas over 100 sq. meters/gram when measured by gas adsorption. Alumina gels containing between about 1% and 15% and preferably between about 3% and 8% of coprecipitated silica are especially suitable carriers. The presence of the small amount of silica in the alumina appears to stabilize the resulting catalyst and prolongs the catalyst life as is described in U. S. Patent 2,437,532.

In the preferred method for the preparation of the catalyst, an impregnation method is employed wherein the carrier is immersed in an aqueous solution containing nickel sulfate following a suitable heat treatment to render it sufficiently adsorbent.

In one modification of the invention hydrofluoric and/or hydrochloric acids may be incorporated into the nickel sulfate catalyst by impregnation. These acids may be co-impregnated with the nickel sulfate or alternatively the acid may be impregnated either before or after the impregnation of the nickel sulfate.

Prior to the impregnation steps, the carrier is normally shaped into the physical form desired for the catalyst. For this purpose the dried carrier is usually ground, mixed with a lubricant such as graphite and/or hydrogenated vegetable oil, and pilled. In the activation of the carrier by heating the lubricant is removed by combustion. Alternatively the carrier may be used in granular form, or it may be ground into powder, made into a paste and extruded. Where the catalyst is to be employed in a fluidized process, such as in fluidized desulfurization, denitrogenation, and the like, the carrier is formed into a finely divided state as in micro-bead form, or it is ground into a fine state and is thereafter impregnated. In the case of fluidized processes the carrier can be impregnated in larger form, e. g. granules, pills, etc., and thereafter ground to the desired powder size for the processing.

In the preparation of the carrier for impregnation with nickel sulfate and/or the inorganic halogen-containing acid, the heating or activation step to render it sufficiently adsorbent may be effected by heating from two to six hours at 600° F. to 1200° F. for example. Activation temperatures as low as about 300° F. may be employed without difficulty however. The carrier is cooled and is thereafter immersed in the nickel sulfate impregnation solution. Where multiple impregnations are employed such as where nickel and sulfate or the nickel sulfate and inorganic halogen acid are separately impregnated the carrier is normally reactivated by heating to at least about 300° F. and preferably to above about 500° F. between impregnations.

The nickel sulfate impregnation solution is usually an aqueous solution of nickel sulfate. The concentration of the nickel sulfate in the solution will depend upon the particular carrier being employed and upon the desired concentrations of nickel and sulfate in the finished catalyst.

Where a finished catalyst comprising between about 1% and 30% of nickel sulfate is desired, the impregnation solution will contain between about 2 and 70 grams of nickel sulfate per 100 ml. of solution. Catalysts containing between 30% and 50% of nickel sulfate are usually prepared by multiple impregnation.

In the impregnation of the carrier with nickel sulfate the activated carrier is immersed in the impregnation solution for a short time such as between about 2 minutes and 60 minutes for example. A more uniform penetration of the impregnation solution is obtained with longer impregnation periods.

After immersion in the impregnation solution a part of the impregnation solution is adsorbed by the carrier and the excess solution is thereafter removed. The impregnated carrier after draining and drying in a low temperature oven such as at 180° F. to 230° F., for example, is finally activated by heating to a temperature of 600° F. to 1000° F. for two to six hours. The final activation may be carried out by bringing the dried impregnated carrier to the required reaction temperature.

In the simplest modification of the invention the carrier is impregnated with aqueous nickel sulfate. However in other modifications of the invention derivatives of nickel sulfate such as double salts with organic compounds and/or basic sulfates of nickel may be employed. As examples of double salts of nickel sulfate compounds of nickel sulfate with varying amounts of ammonia, hydrazine, hydroxyl amine and the like may be employed. Basic sulfates of nickel which have the elements of compounds of nickel sulfate and nickel oxide with varying amounts of water may similarly be employed. Such compounds for example may be obtained by employing impregnation solutions containing nickel sulfate and nickel nitrate wherein the nickel nitrate is preferentially decomposed to the oxide by heating at low temperatures such as above 400° F.

While catalysts prepared by the method of this invention may be prepared which contain different percentages of nickel sulfate, those containing between about 1% and 50% and preferably between about 3% and 20% by weight are most generally employed. Although the impregnation method described hereinbefore is the preferred method, other methods may be employed such as coprecipitation, copilling and the like. Thus a hydrous alumina gel may be mixed with an aqueous solution of nickel sulfate for example and the mixture dried at 200° to 300° F. for example to obtain the finished catalyst. In other methods of preparation a hydrogel of nickel and alumina may be prepared, dried, and the absorbent material impregnated with sulfuric acid to convert a part of the nickel to nickel sulfate for example.

In one modification of the invention the nickel and sulfate may be employed in non-equivalent amounts. Ordinary nickel sulfate on an anhydrous basis contains about 37.9% by weight of nickel. Other nickel salts may be employed with the nickel sulfate to increase the ratio of nickel to sulfate such as nickel chloride, nickel nitrate and the like. Alternatively other sulfates such as ammonium sulfate, sulfuric acid, copper sulfate, cobalt sulfate, iron sulfate, cadmium sulfate and the like may be employed to decrease the ratio of nickel to sulfate. Furthermore the nickel may be deposited in one impregnation step and the carrier after activation may be impregnated with a sulfate; alternatively the sulfate may be impregnated prior to the impregnation of the nickel.

Usually the catalyst will contain between about 0.4% and 20% and preferably between about 1% and 12% by weight of nickel and will contain between about 0.6% and 30% and preferably between about 1% and 18% by weight of sulfate.

The finished catalysts of this invention are useful for effecting the reforming of gasoline boiling range hydrocarbon stocks in order to improve the octane rating, decrease the gum-forming tendencies, effect mild desulfurization, denitrogenation, isomerization, dehydrogenation, hydrogenation and otherwise improve the stock. Such reactions are carried out in the presence of hydrogen at temperatures in the range of 700° F. to 1200° F. and preferably in the range of about 850° F. to 1000° F. Under the reaction conditions hydrogen is produced which is customarily recycled with the incoming feed stock. The reaction is carried out at pressures between about atmospheric and 2000 p. s. i. and preferably in the range of 50 p. s. i. to 1000 p. s. i. The feed rate may vary between about 0.2 and 10.0 volumes of liquid feed stock per volume of catalyst per hour and between about 500 and 10,000 cubic feet of recycle hydrogen is employed per barrel of feed.

These reactions may be carried out in a single catalyst case or in a plurality of catalyst cases either in series or in parallel, or alternatively the catalyst may be employed in moving bed, fluidized bed or other such types of catalytic processes.

During usage small amounts of deposits which comprise mostly carbon, nitrogen and sulfur compounds accumulate on the catalyst. The slow build-up of such deposit is not serious and does not impair the catalyst cativity for a considerable period of time. Because of the relatively good heat stability of the catalyst such deposit may be removed from time to time as the activity declines by combustion with air at controlled oxidation temperatures such as below 1100° F.

When the catalyst is employed for high sulfur stocks such as those containing between about 0.5% and 4.0% by weight of sulfur, there is some tendency for the catalyst to decline in activity, which decline seems to result from the slow build-up of sulfur on the catalyst. When the regeneration gases contain steam in excess of 5% and preferably in excess of 15% by volume, the rate of catalyst decline with successive regenerations is considerably lessened.

In certain cases such as when high sulfur stocks are being employed as the feed stock, water may be added to the feed to minimize sulfiding of the catalyst. Usually the added water will amount to between about 0.5 and 10 volumes per cent of the feed.

After regeneration the catalyst is reduced with hydrogen prior to its employment for hydrocarbon conversions. Fresh catalyst is also reduced with hydrogen normally prior to employment for hydrocarbon conversion.

The preferred feed stocks for the process of this invention are gasoline boiling range hydrocarbon stocks such as those hydrocarbon liquids boiling between about −10° F. and 500° F. In certain cases higher boiling hydrocarbons may also be employed such as those boiling up to about 900° F., for example. Such hydrocarbon stocks may be derived from petroleum, shale oil, hydrogenated coal, synthetic gasolines and the like.

Where a halogen acid is employed with the nickel sulfate catalyst, the impregnation solution may be prepared from fluorine-containing inorganic acids such as hydrofluoric acid, fluorosulfonic acid and fluorosilicic acid and the like, or from a chlorine-containing inorganic acid such as hydrochloric acid, chlorosulfonic acid and the like. The impregnation solution is prepared by dissolving any of the foregoing acids in water.

In general the fluorine or chlorine retained by the carrier varies directly with the concentration of the impregnating solution. With the use of alumina carriers it has been found that the preparation of catalysts containing between 0.2% and 5% by weight of fluorine or chlorine required impregnating solutions containing between about 0.4 and 10.4 grams of fluorine (as F) or chlorine (as Cl) per 100 ml. of solution.

While other concentrations of fluorine or chlorine may sometimes be employed, catalysts containing between about 0.05% and 5% of fluorine or chlorine and preferably between about 0.2% and 3% of fluorine or chlorine are generally employed when such halogen-containing acids are employed as additional promoters.

Perhaps the process of this invention is best illustrated by the following specific examples:

Example I

An alumina-silica gel containing 95% $Al_2O_3$ and 5% $SiO_2$ was prepared by coprecipitation of an aqueous mixture of sodium aluminate and sodium silicate with carbondioxide. The precipitate was washed until substantially free of sodium ions, dried at 200° to 230° F. and activated by heat for two hours at about 1000° F.

A nickel sulfate impregnation solution was prepared by dissolving about 14.4 grams of $NiSO_4 \cdot 6H_2O$ in about 80 grams of distilled water. About 120.5 grams of the dried silica-alumina gel were immersed in the impregnation solution for about 10 minutes, drained, dried at about 250° F. and further activated by heating in the reaction tube to about 900° F. The catalyst so prepared contained about 5.2% by weight of nickel sulfate calculated as $NiSO_4$. For comparison two other catalysts were prepared from aqueous cobalt sulfate and iron sulfate impregnation solutions.

For testing these catalysts a gasoline stock was employed which boiled substantially in the range of between 200° F. and 400° F. and which had been obtained by distillation of a California crude oil. The gasoline contained about 12% aromatics and had an F-1 clear octane rating of 66 which increased to 78 upon the addition of 3 ml. of tetraethyl lead fluid.

The three catalysts were then tested under the following reaction conditions:

| | |
|---|---|
| Temperature, °F | 900 |
| Pressure, p. s. i | 450 |
| Process time, hours | 4 |
| Liquid hourly space velocity | 2.0 |
| Hydrogen addition, cu. ft./barrel of feed | 5000 |

The following analytical data were obtained on the products from the three catalysts:

| Catalytic Agent | Weight Percent of Catalytic Agent | Liquid Yield, Vol. Percent of Feed | Research Octane Rating | | Gas Make, cu. ft./barrel of Feed | |
|---|---|---|---|---|---|---|
| | | | Clear | Plus 3 ml. TEL | $H_2$ | $C_1$-$C_3$ |
| $NiSO_4$ | 5.2 | 95.1 | 77 | 90 | 352 | 72 |
| $CoSO_4$ | 5.1 | 99.5 | 68 | 84 | 208 | 59 |
| $FeSO_4$ | 5.2 | 98.4 | 63.5 | 81.5 | a —126 | | a The minus sign indicates hydrogen consumption.

From the foregoing data it is apparent that nickel sulfate on silica-alumina is a very active catalyst for upgrading a gasoline stock and is considerably more active than corresponding catalysts prepared from either cobalt sulfate or ferric sulfate. The nickel sulfate catalyst gave the best product quality as well as the greatest hydrogen yield.

Example II

Another series of experiments were performed to show the superior activity of the nickel sulfate catalyst over a sulfided nickel oxide catalyst. The nickel oxide catalyst was prepared by impregnating the alumina-silica carrier of Example I with sufficient nickel nitrate to form a catalyst containing about 5.2% of NiO and the resulting composition was treated with hydrogen sulfide gas at the reaction conditions, viz. 900° F., to form a nickel sulfide on alumina catalyst. The resulting nickel sulfide catalyst was then compared with the nickel sulfate catalyst prepared in Example I under the test conditions described in Example I which contained 5.2% $NiSO_4$.

The following analytical data were obtained on the products from the two catalysts.

| Catalyst | Liquid Recovery, Volume Percent of Feed | Research Octane Rating | | Gas Make, cu. ft./bbl. feed | |
|---|---|---|---|---|---|
| | | Clear | Plus 3 ml. TEL | $H_2$ | $C_1$-$C_3$ |
| $NiSO_4$ | 95.1 | 77.0 | 90.0 | 352 | 72 |
| Ni-sulfided | 95.5 | 69.0 | 87.5 | 169 | 82 |

It should be noted that the NiO catalyst employed for the sulfiding contained more nickel than did the $NiSO_4$ catalyst. The nickel content of the NiO catalyst is equivalent to a 10.8% $NiSO_4$ catalyst. In spite of the considerable advantage of increased metal content in favor of the sulfided catalyst, the data show the superiority of the nickel sulfate catalyst.

Example III

In another series of experiments the effect of concentration of nickel sulfate on the catalyst was examined for four catalysts prepared according to the method described in Example I. The following analytical data were obtained on the products from the four catalysts:

| Percentage of $NiSO_4$ by Weight | Liquid Recovery, Volume Percent of Feed | Research Octane Rating | | Gas Make, cu. ft./bbl. feed | |
|---|---|---|---|---|---|
| | | Clear | Plus 3 ml. TEL | $H_2$ | $C_1$-$C_3$ |
| 3.0 | 98.2 | 73 | 88 | 312 | 36 |
| 5.2 | 95.1 | 77 | 90 | 352 | 72 |
| 15.0 | 92.6 | 79 | 92.5 | 525 | 50 |
| 25.8 a | 93.5 | 82 | 93 | 668 | 105 | a Calcined at 1112° F. for 6 hours prior to usage.

Example IV

In another series of experiments the effect of reaction temperature on the conversion obtained with a nickel sulfate catalyst containing 7.5% by weight of nickel sulfate on the carrier of Example I was determined when the remaining operating variables were maintained the same as in Example I. The following data were obtained:

| Reaction Temperature, °F. | Liquid Recovery, Volume Percent of Feed | Research Octane Rating | | Gas Make, cu. ft./bbl. feed | |
|---|---|---|---|---|---|
| | | Clear | Plus 3 ml. TEL | $H_2$ | $C_1$-$C_3$ |
| 900 | 97.2 | 76 | 91 | 297 | 59 |
| 930 | 92.0 | 81 | 95 | 411 | 143 |
| 960 | 89.0 | 87 | 98 | 454 | 224 |

Example V

About 500 parts of hydrous alumina gel containing about 90% by weight of water is mixed with nickel sulfate hexahydrate containing about 10 parts by weight of $NiSO_4$. The intimate mixture is dried at 200–230° F. to produce the finished catalyst. The 10% $NiSO_4$-90% $Al_2O_3$ catalyst obtained thereby is less active than the corresponding impregnated catalyst but shows the same desirable selectivity for dehydrogenation in preference to hydrocracking when tested according to the method of Example I.

Example VI

An ammoniacal nickel sulfate solution is prepared by dissolving nickel sulfate hexahydrate in 10% ammonium hydroxide to form a solution containing 11 grams of nickel sulfate per 100 ml. When the alumina-silica carrier of Example I is impregnated with this solution, the resulting catalyst contains 5% by weight of NiSO₄ and shows selective dehydrogenation and inhibited hydrocracking activity.

*Example VII*

An impregnation solution is prepared by dissolving nickel nitrate and nickel sulfate in water to form a solution containing 11 grams of NiO calculated on the basis of the nitrate and 11 grams of NiSO₄ calculated on the basis of the nickel sulfate. The catalyst obtained by impregnating the carrier of Example I with this solution contains 5% NiO and 5% NiSO₄ and is more selective for dehydrogenation than a corresponding 10% NiO-alumina-silica catalyst.

*Example VIII*

An impregnation solution is prepared by dissolving 15 grams of nickel sulfate hexahydrate and 2 grams of sulfuric acid in water to form 100 ml. of solution. When this solution is used to impregnate the carrier of Example I, it is found that the presence of the sulfuric acid increases the selectivity of the catalyst for dehydrogenation when compared to a corresponding catalyst prepared without sulfuric acid.

*Example IX*

An impregnation solution is prepared by dissolving a nickel sulfate hexahydrate in 1% hydrofluoric acid to produce a solution containing 11 grams of nickel sulfate per 100 ml. When the carrier of Example I is impregnated with this solution, the catalyst obtained shows a high dehydrogenation and isomerization activity when tested according to the method of Example I. The catalyst contains about 0.4% by weight of fluorine and 5% by weight of NiSO₄.

When the Examples I to IX are repeated using substantially pure alumina gel in place of the silica-alumina gel for supporting the nickel sulfate, the same favorable results are obtained.

*Example X*

A 25.8% NiSO₄ on silica-alumina was prepared by impregnating the carrier of Example I with aqueous nickel sulfate. After drying the impregnated carrier was heated to 1112° F. for 6 hours and then tested according to the method of Example I. The carboned catalyst from the run was regenerated by passing air through the catalyst bed and the regenerated catalyst was retested. After a second regeneration the catalyst was treated with hydrogen sulfide and the sulfided catalyst was tested. After the run with the sulfided catalyst, the regeneration gases contained little or no sulfur dioxide, the presence of which would have indicated removal of the sulfide-type sulfur from the catalyst. Upon adding about 15% by volume of steam to the air, the spent regeneration gases contained sulfur dioxide indicating removal of the sulfur deposited by the hydrogen sulfide. The regenerated catalyst was retested. The following tabulation summarizes the data for the four runs.

|  | Liquid Recovery, Volume Percent of Feed | Research Octane Rating | | Gas Make, cu. ft./bbl. feed | |
|---|---|---|---|---|---|
|  |  | Clear | Plus 3 ml. TEL | $H_2$ | $C_1-C_3$ |
| Fresh | 93.5 | 82 | 93 | 668 | 105 |
| Regenerated | 94.2 | 83 | 93 | 695 | 94 |
| Regenerated and sulfided | 96.5 | 75 | 89 | 287 | 60 |
| Regenerated with air and $H_2O$ | 95.0 | 77 | 92 | 515 | 69 |

The foregoing data show that sulfide-type sulfur is removed with air-water regeneration and the fresh activity is mostly restored by such regeneration.

Iron sulfate and cobalt sulfate catalysts supported on alumina type carriers are prepared by substituting analogous iron or cobalt compounds for the nickel compounds described hereinbefore. Iron and cobalt are distinctly inferior to the nickel catalysts however. Cobalt is generally superior to iron for most purposes.

In broad aspect this invention relates to a new catalyst for the catalytic reforming of gasoline stocks in the presence of hydrogen. The new nickel sulfate-alumina catalysts have good stability and show high activity for the desired reactions and low activity for the undesired hydrocracking. It is apparent that other metal oxides and/or metal sulfates may be incorporated into the catalyst of this invention while still obtaining the desirable characteristics of the nickel sulfate components.

The foregoing disclosure of this invention is not to be considered as limiting since many variations may be made by those skilled in the art without departing from the scope or spirit of the following claims.

I claim:

1. A process for the catalytic reforming of gasoline boiling range hydrocarbons to improve the octane rating thereof which comprises contacting said hydrocarbons at a temperature between about 850° and 1000° F. with hydrogen and a catalyst, said catalyst consisting essentially of an intimate mixture of (1) between about 0.4% and 20% by weight of nickel, (2) between about 0.6% and 30% by weight of combined sulfate radicals, and (3) a major proportion of a predominantly alumina carrier, and continuing said contacting for a sufficient length of time to effect a substantial improvement in octane rating of said hydrocarbons.

2. A process as defined in claim 1 wherein the weight ratio of nickel to sulfate radicals in said catalyst is substantially that which exists in nickel sulfate.

3. A process as defined in claim 1 wherein the carrier in said catalyst consists of a major proportion of alumina and between about 1% and 15% by weight of intimately admixed silica.

4. A process for the catalytic reforming of gasoline boiling range hydrocarbons to improve the octane rating thereof which comprises contacting said hydrocarbons at a temperature between about 850° and 1000° F. with hydrogen and a catalyst, said catalyst consisting essentially of an intimate mixture of (1) between about 3% and 20% by weight of nickel sulfate and (2) a major proportion of a predominantly alumina carrier, and continuing said contacting for a sufficient length of time to effect a substantial improvement in octane rating of said hydrocarbons.

5. A process as defined in claim 4 wherein said catalyst is prepared by impregnating said carrier with an aqueous solution of nickel sulfate and then calcining the impregnated carrier.

6. A process for the catalytic reforming of gasoline boiling range hydrocarbons to improve the octane rating thereof which comprises contacting said hydrocarbons at a temperature between about 850° and 1000° F. with hydrogen and a catalyst, said catalyst consisting essentially of an intimate mixture of (1) between about 0.4% and 20% by weight of nickel, (2) between about 0.6% and 30% by weight of combined sulfate radicals, (3) between about 0.05% and 5% by weight of a combined halogen selected from the class consisting of fluorine and chlorine, and (4) a major proportion of a predominantly alumina carrier, and continuing said contacting for a period of time sufficient to effect a substantial improvement in octane rating of said hydrocarbons.

7. A process as defined in claim 6 wherein the carrier in said catalyst consists of a major proportion of alumina and between about 1% and 15% by weight of intimately admixed silica.

8. A process as defined in claim 6 wherein said catalyst is prepared by impregnating the said nickel, sulfate, and halogen components onto said carrier from aqueous solution, followed by a final calcining.

9. A process for the catalytic reforming of gasoline boiling range hydrocarbons to improve the octane rating thereof which comprises contacting said hydrocarbons at a temperature between about 850° and 1000° F. with hydrogen and a catalyst, said catalyst consisting essentially of an intimate mixture of (1) between about 0.4% and 20% by weight of nickel, (2) between about 0.6% and 30% by weight of combined sulfate radicals, and (3) a major proportion of a predominantly alumina carrier, continuing said contacting for a sufficient length of time to effect a substantial improvement in octane rating of said hydrocarbons and until said catalyst has substantially declined in activity, then regenerating said catalyst by heating the same in the presence of a gas containing free oxygen and at least 15% by volume of water vapor to thereby remove contaminating coke and sulfide-sulfur deposits, and again contacting the regenerated catalyst with hydrocarbons under said reforming conditions.

References Cited in the file of this patent

UNITED STATES PATENTS

| | | |
|---|---|---|
| 2,227,672 | Pier et al. | Jan. 7, 1941 |
| 2,267,735 | Ipatieff et al. | Dec. 30, 1941 |
| 2,273,297 | Szayna | Feb. 7, 1942 |
| 2,366,725 | Gardner | Jan. 9, 1945 |
| 2,426,118 | Parker et al. | Aug. 19, 1947 |
| 2,500,146 | Fleck et al. | Mar. 14, 1950 |